United States Patent
Gallagher et al.

(10) Patent No.: US 8,286,414 B2
(45) Date of Patent: Oct. 16, 2012

(54) PRESSURE CONTROL METHOD AND SYSTEM TO REDUCE GAS TURBINE FUEL SUPPLY PRESSURE REQUIREMENTS

(75) Inventors: Brian Gallagher, Simpsonville, SC (US); Ravi Praveen S. Eluripati, Simpsonville, SC (US); Jonathan Carl Thatcher, Liberty, SC (US); Priscilla Childers, Greenville, SC (US); Bryan Edward Sweet, Valatie, NY (US)

(73) Assignee: General Electric Company, Schenectady, NY (US)

( * ) Notice: Subject to any disclaimer, the term of this patent is extended or adjusted under 35 U.S.C. 154(b) by 807 days.

(21) Appl. No.: 12/457,075

(22) Filed: Jun. 1, 2009

(65) Prior Publication Data

US 2009/0241510 A1    Oct. 1, 2009

Related U.S. Application Data

(62) Division of application No. 11/353,953, filed on Feb. 15, 2006, now Pat. No. 7,549,293.

(51) Int. Cl.
*F02C 7/22* (2006.01)
(52) U.S. Cl. .......................... 60/39.281; 60/734; 60/773
(58) Field of Classification Search ............... 60/39.281, 60/734, 773
See application file for complete search history.

(56) References Cited

U.S. PATENT DOCUMENTS

| | | | |
|---|---|---|---|
| 4,506,504 A | 3/1985 | Nick | |
| 4,583,360 A | 4/1986 | Nick | |
| 4,716,719 A | 1/1988 | Takahashi et al. | |
| 4,922,710 A * | 5/1990 | Rowen et al. | 60/39.281 |
| 6,092,362 A | 7/2000 | Nagafuchi et al. | |
| 6,145,297 A | 11/2000 | Nagafuchi et al. | |
| 6,457,313 B1 | 10/2002 | Fujii | |
| 6,907,722 B2 | 6/2005 | Tanaka | |
| 7,047,747 B2 | 5/2006 | Tanaka | |

FOREIGN PATENT DOCUMENTS

| | | |
|---|---|---|
| JP | 54044115 A | 4/1979 |
| JP | 60216061 A | 10/1985 |
| JP | 62-078406 | 4/1987 |
| JP | 03-023302 | 1/1991 |
| JP | 06-101808 | 4/1994 |
| JP | 07-166891 | 6/1995 |
| JP | 08-035435 | 2/1996 |
| JP | 10-159585 | 6/1998 |
| JP | 2002-364385 | 12/2002 |
| JP | 2005-146963 | 6/2005 |

OTHER PUBLICATIONS

JP Office Action dated May 15, 2012 from corresponding Application No. 2007-031905 along with unofficial English translation.
Japanese Office Action dated Jun. 28, 2011, issued in corresponding Japanese Application No. 2007-031905.

* cited by examiner

*Primary Examiner* — William H Rodriguez
*Assistant Examiner* — Lorne Meade
(74) *Attorney, Agent, or Firm* — Nixon & Vanderhye PC

(57) ABSTRACT

A system and method to reduce the gas fuel supply pressure requirements of a gas turbine, which results in an increased operability range and a reduction in gas turbine trips. According to the method, the gas turbine is allowed to start and operate at supply pressures determined as a function of ambient conditions and gas turbine compressor pressure ratio. This increases the operability window, and reduces or eliminates the need for gas fuel compressors.

8 Claims, 6 Drawing Sheets

PRESSURE CONTROL METHOD AND SYSTEM TO REDUCE GAS TURBINE FUEL SUPPLY PRESSURE REQUIREMENTS

CROSS-REFERENCE TO RELATED APPLICATION

This application is a Divisional of application Ser. No. 11/353,953, filed Feb. 15, 2006 (now U.S. Pat. No. 7,549,293), the entire contents of which are hereby incorporated by reference into this application.

BACKGROUND OF THE INVENTION

A minimum gas fuel supply pressure is required to provide the motive force for the fuel to overcome losses due to strainers, valves, piping and fuel nozzles, and enter the combustion chamber of a gas turbine under all potential operating conditions.

The existing gas fuel control system is based on a fixed gas fuel supply pressure requirement (referred to as P2 pressure requirement) from full speed no load (FSNL) to base load, irrespective of ambient conditions. The fixed requirement is based on worst-case conditions: base load on the coldest day, that is the coldest ambient design temperature for the particular site. If the gas fuel supply pressure is less then the control system pressure requirement, the gas turbine is inhibited from starting. If the gas fuel supply pressure falls below the control system requirement by 20 psi during operation, the control system initiates a runback to a predetermined low load mode of operation and operator action is then required.

If source gas supply pressure is expected to be lower than the fixed gas turbine supply requirement, then expensive gas fuel compressors are required to ensure gas turbine operability. This, however, is a very expensive solution that costs plant owners millions of dollars in initial investment and consumes high auxiliary power loads. Indeed, the gas compressors pressurize the gas fuel to the cold ambient day supply pressure requirement even when the actual pressure required may be much lower, thereby wasting hundreds of kilowatts.

BRIEF DESCRIPTION OF THE INVENTION

A method and control system are provided according to an example embodiment of the invention to allow the gas turbine to start and operate at lower supply pressures than those dictated by the worst-case conditions and as such increases the operability window, reducing or potentially eliminating the need for expensive gas fuel compressors.

Thus, the invention may be embodied in a method of determining a fuel pressure reference for supply from a pressure control valve to a gas control valve of a plurality of fuel nozzles in a gas turbine combustor, comprising: determining a first required fuel pressure upstream to the fuel nozzles; determining a minimum allowable pressure requirement upstream of the gas control valve based on said first required fuel pressure; and determining the fuel pressure reference for control of the pressure control valve based on said minimum allowable pressure requirement.

The invention may also be embodied in a gas turbine combustor provided with a plurality of fuel nozzles and a pressure control system for controlling fuel supply pressure to said fuel nozzles, comprising: fuel pipes defining a path for gas fuel to flow from an upstream fuel inlet to said fuel nozzles, including a main fuel passage and a distribution fuel pipe to said fuel nozzles; a fuel flow control valve for controlling fuel flow in said distribution fuel pipe to said fuel nozzles; and a pressure control valve disposed in said main fuel pipe, upstream from said fuel flow control valve, wherein the control system is operatively coupled to said pressure control valve and to said fuel flow control valve to control a pressure downstream of said pressure control valve and flow through said fuel flow control valve, said control system selectively setting a fuel pressure reference for control of the pressure control valve based on compressor discharge pressure.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
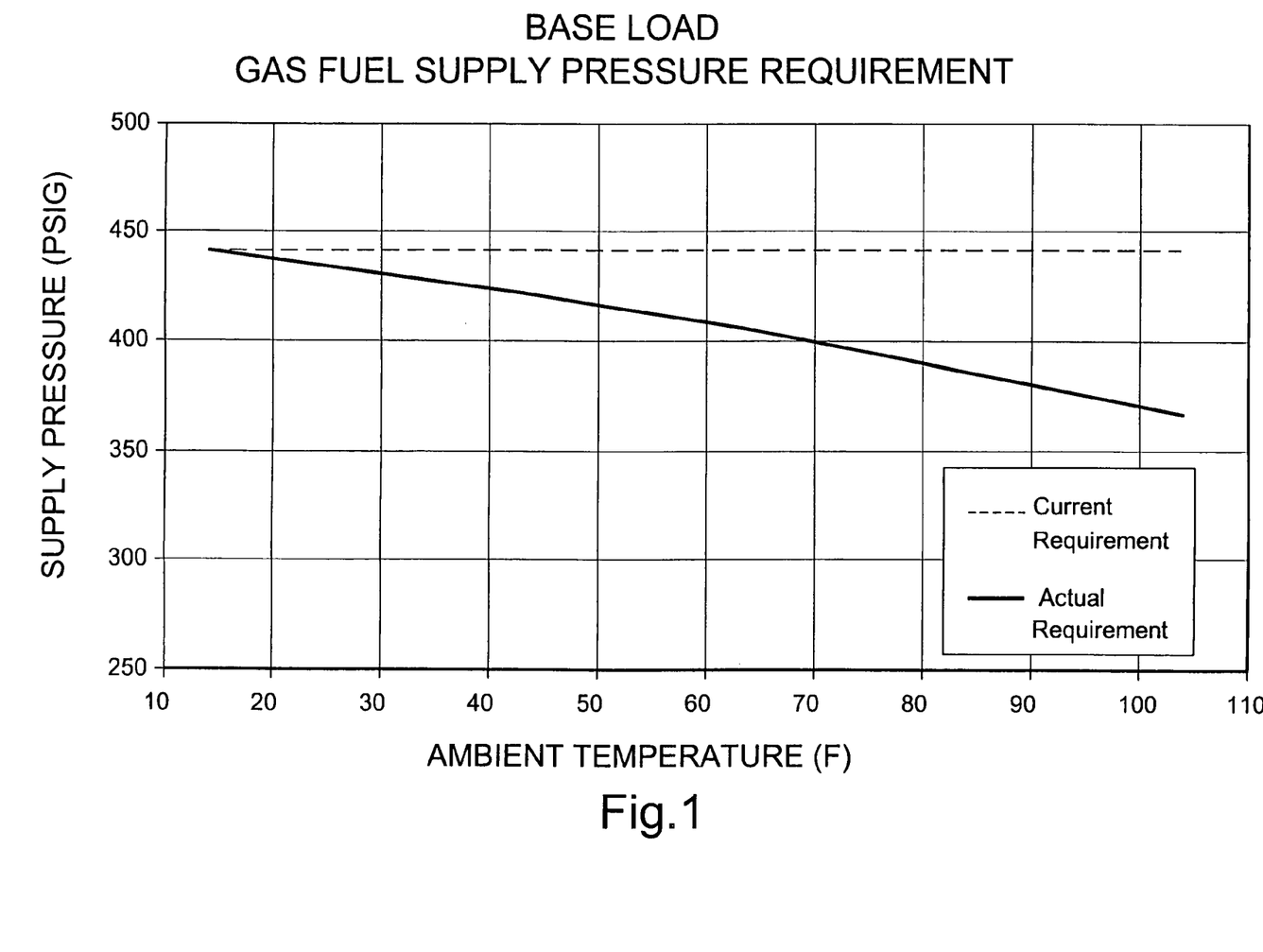
FIG. 1 is a graph schematically illustrating base load gas fuel supply pressure requirement versus ambient temperature.

As noted above, the existing gas fuel control system is based on a fixed gas fuel supply pressure requirement that is determined from worst-case conditions. However, the actual gas turbine supply pressure requirement is a function of ambient conditions and gas turbine compressor pressure ratio. Thus, as ambient temperature increases from the site minimum that determined the fixed requirement, the difference between the pre-set, fixed requirement and the actual gas turbine requirement increases (FIG. 1).

The invention seeks to shift this paradigm by allowing the gas fuel supply pressure requirement to slide as a function of ambient conditions rather than following the conventional fixed, worst case requirement embodying the conventional gas fuel control philosophy. The intent of the sliding or modulated pressure control embodying the invention is to allow the gas turbine to start and operate at lower gas fuel supply pressures than was permitted according to the conventional control philosophy. Thus, as noted above, the invention provides a pressure control method and system to allow the gas fuel supply pressure requirement, below which the gas turbine is inhibited from starting, to be determined as a function of, e.g., ambient temperature, ambient pressure and gas turbine load.

In an example embodiment of the invention, the pressure control system sets the fuel supply pressure requirement based in part on compressor discharge pressure which accounts for ambient temperature, ambient pressure and gas turbine load. The supply pressure requirement is calculated for all potential modes of operation and plotted as a function of compressor discharge pressure (see for example the schematic illustrations of FIGS. 3, 5 and 6, discussed below).

Figure 3:
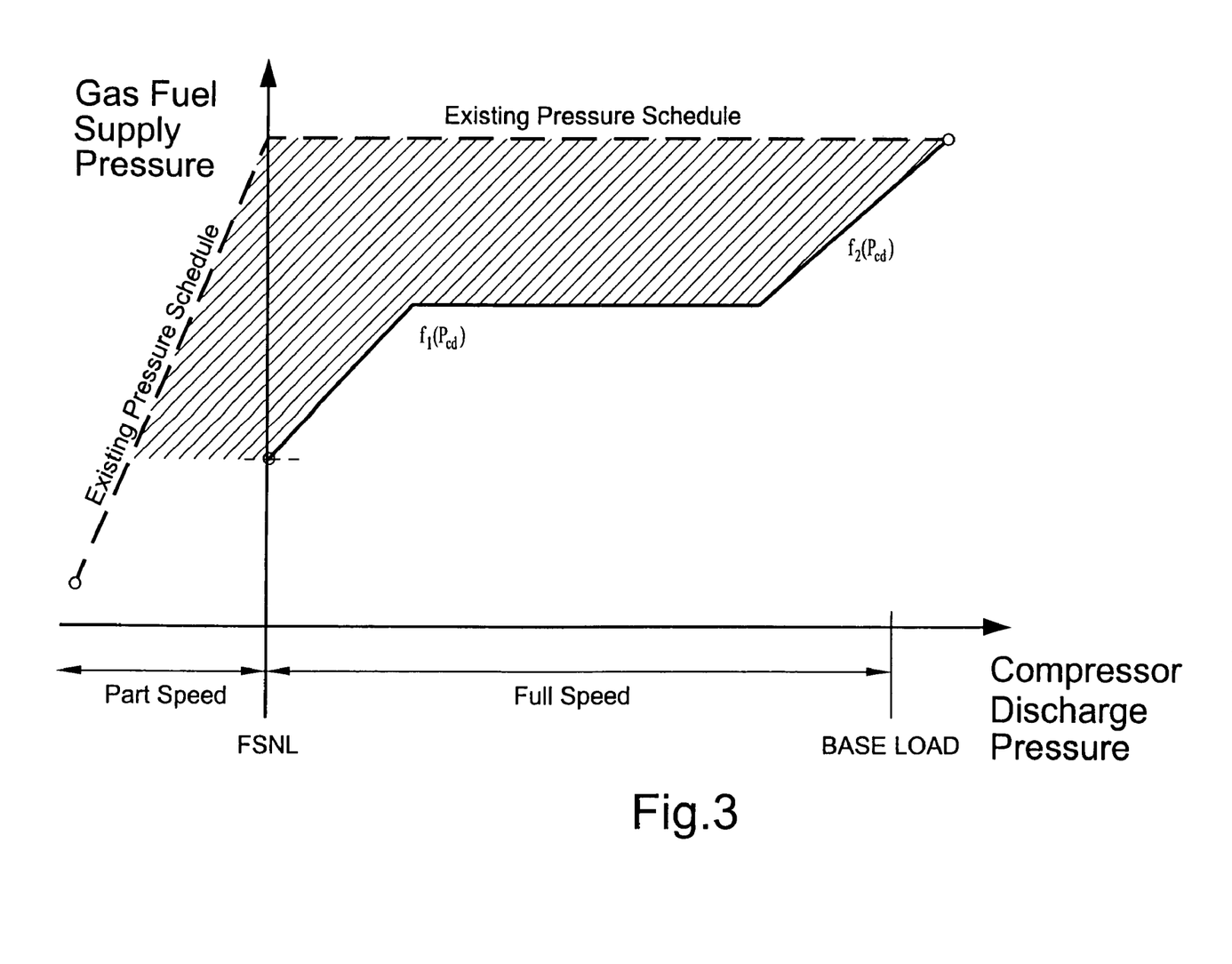
FIG. 3 schematically illustrates the increased operability window using modulated pressure control according to an example embodiment of the invention.

In FIG. 3, the dashed line shows the current supply pressure requirement, which is a fixed number at any gas turbine load. The solid line shows a pressure requirement according to an example embodiment of the invention. The shaded region between these supply pressure requirements is inoperable with the existing control philosophy but becomes operable with modulated pressure control according to this example embodiment of the invention. As will be understood, the cold ambient day base load pressure requirement is the point in the upper right corner of the graph where the horizontal dashed line meets the solid line representing modulated pressure requirement control. If the supply pressure drops below this requirement when operating at base load, the control system unloads the gas turbine along the solid pressure requirement line.

Figure 2:
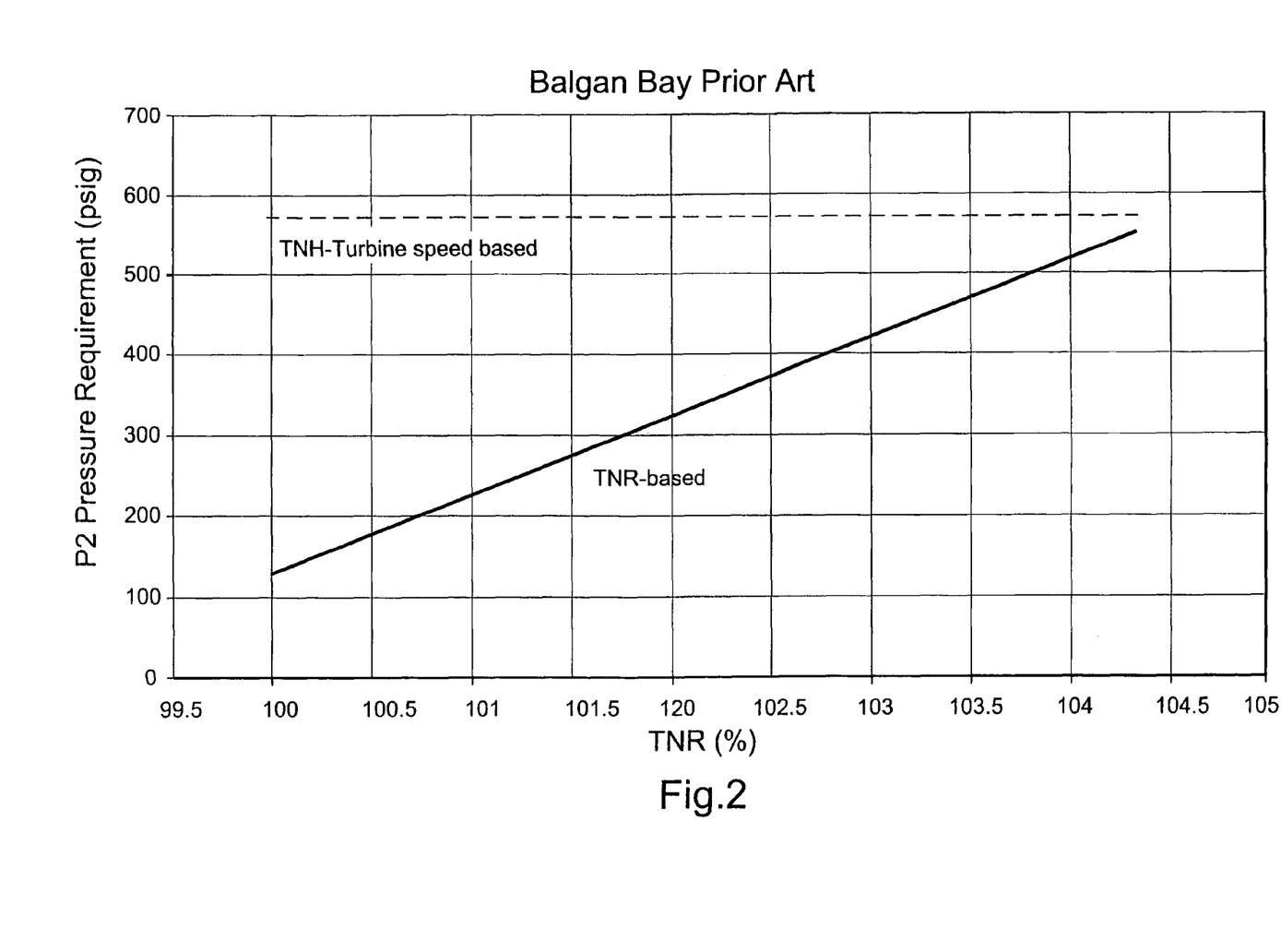
FIG. 2 is a graph schematically illustrating TNR-based P2 pressure requirement according to a related art.

A version of sliding or modulated pressure control has been implemented on a 9H frame gas turbine at a site at Baglan Bay, in Wales. However, that version of sliding pressure control is only a protective measure to prevent the gas control valves from going unchoked when the fuel supply pressure (P2 pressure) drops below a predetermined set point, causing uncontrolled fuel flow. Thus, at Baglan Bay, the sliding pressure control is not a normal operating mode and is only activated in an upset condition. Moreover, the minimum fuel supply pressure required is a function of the speed-load reference (referred to as TNR) (FIG. 2).

Speed load reference (TNR) is a good indicator of gas turbine load, but does not take into consideration all of the gas turbine parameters affecting fuel pressure requirement calculations. The invention proposes a more effective way to control fuel pressure using Compressor Discharge Pressure (CPD) instead. The disadvantages of using TNR include: (1) P2 pressure reference does not react to grid frequency changes, (2) TNR-based control assumes a particular loading path and thus has to be biased for ambient conditions, and (3) TNR adds complication to control sequencing, requiring the use of ambient temperature sensors or CTIM biased for Inlet Bleed Heat (IBH) at part loads. The advantages of using CPD include: (1) CPD is more representative of the sink pressure that fuel supply pressure has to overcome and hence is a better controlling parameter, and (2) CPD does not need to be biased for ambient temperature.

Figure 4:
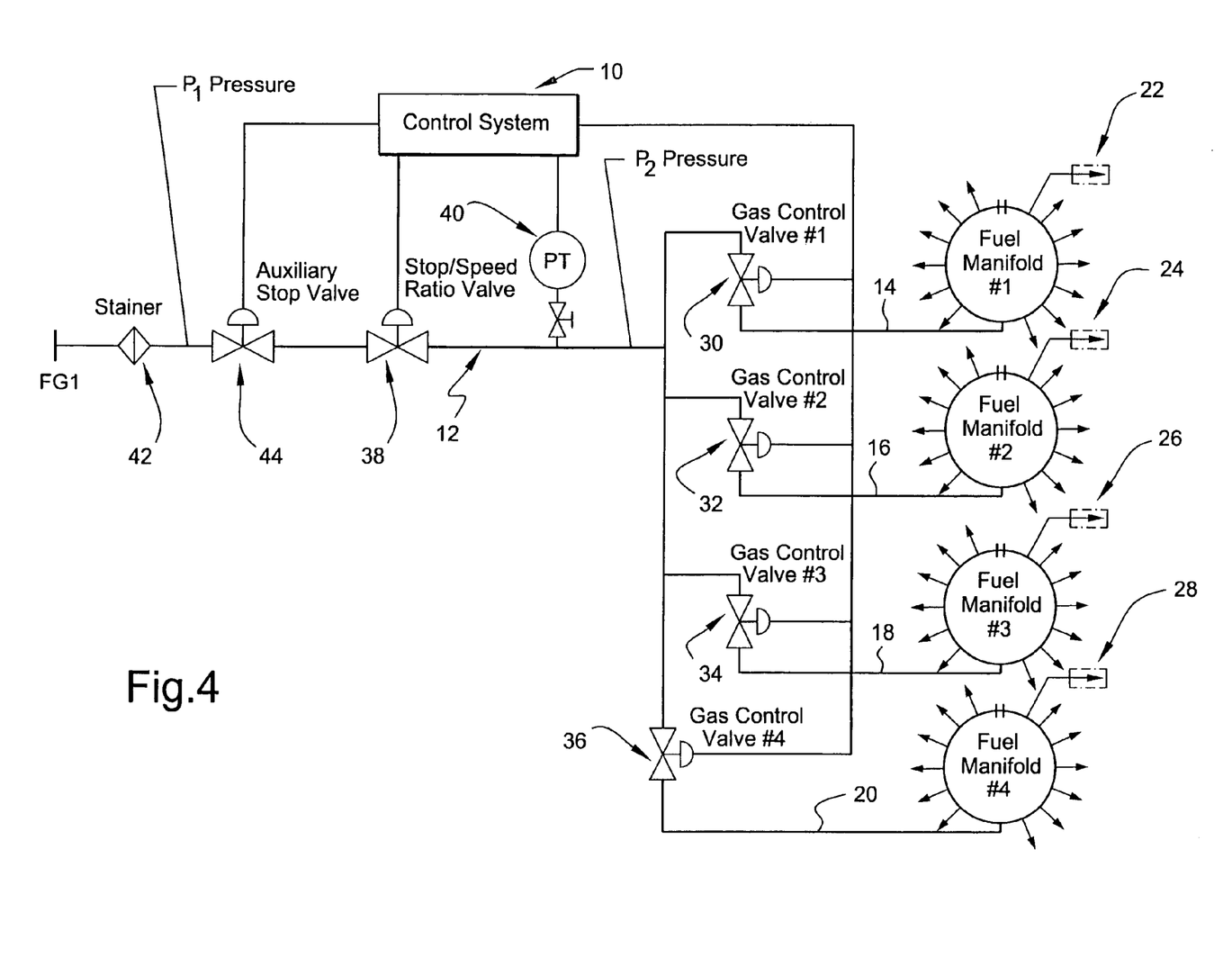
FIG. 4 is a diagrammatic view of a pressure control system embodying the present invention.

Referring to FIG. 4, a fuel pressure control system included in a gas turbine is schematically illustrated as having a plurality of pipes defining a flow path for fuel from an upstream inlet to the fuel nozzles, including a main fuel pipe 12 and distribution pipes 14, 16, 18, 20 to the nozzles. By way of example, four fuel manifolds are further illustrated for conducting fuel to a respective plurality of fuel nozzles 22, 24, 26, 28 only one of which is depicted for each fuel manifold for ease of illustration. The control system, schematically depicted as 10, provides a fuel flow control signal to control the respective openings of gas flow control valves 30, 32, 34, 36 associated with the respective distribution pipes for flow control thereto. The control system further provides a pressure control signal to control pressures in pipe 12 by controlling the stop/speed ratio valve 38, and a pressure transducer 40 is connected to the exit side of the valve 38 for feed back to the control system.

As labeled in FIG. 4, P1 pressure is the pressure downstream of the strainer 42 and upstream of the auxiliary stop valve 44 and stop/speed ratio valve 38, whereas the P2 pressure is the pressure downstream of the stop/speed ratio valve 38, as supplied to the gas control valves 30, 32, 34, 36. Thus, valve 38 adjusts the pressure of the fuel to a predetermined pressure P2. The fuel (initially) at P2 pressure then flows through the pipe 12 to the respective gas flow control valves 30, 32, 34, 36 which adjusts the flow of the fuel to a predetermined flow and the fuel is supplied at the predetermined flow through the distribution pipes to the respective fuel manifolds and on to each nozzle for combustion in the gas turbine combustor. Thus, opening of the stop/speed ratio valve 38 is regulated on the basis of the pressure control signal provided by the control system. Likewise, the opening of the control valve is regulated on the basis of a flow control signal provided by the control system.

Fuel pressure reference, P2 reference, P2 supply requirement and like terminology as used herein are all terms meaning the same thing. The term 'Reference' of course is a general industry-standard controls term that describes the set point for closed-loop control. In this case, the P2 reference is the set point for the stop/speed ratio valve 38 (SRV) that is used to control the fuel gas pressure based on a given control curve. In other words, the P2 reference is the request from the controller to the SRV. The existing system has a fixed P2 fuel pressure reference whereas the sliding or modulated pressure control of the invention introduces a varying P2 reference which is the focus of the disclosure herein.

Figure 5:
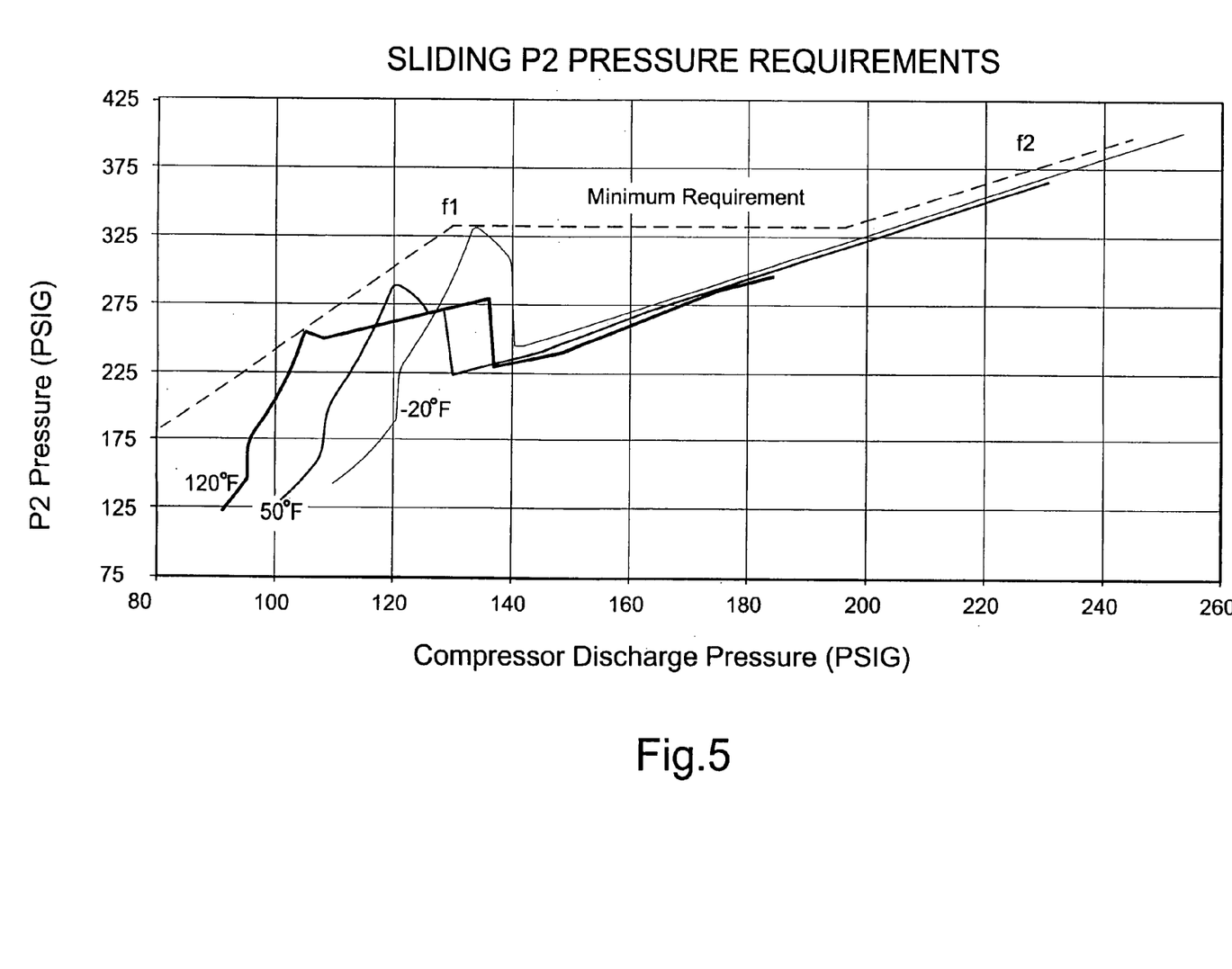
FIG. 5 is a graph schematically illustrating derivation of the minimum allowable pressure requirement according to an example embodiment of the invention.
Figure 6:
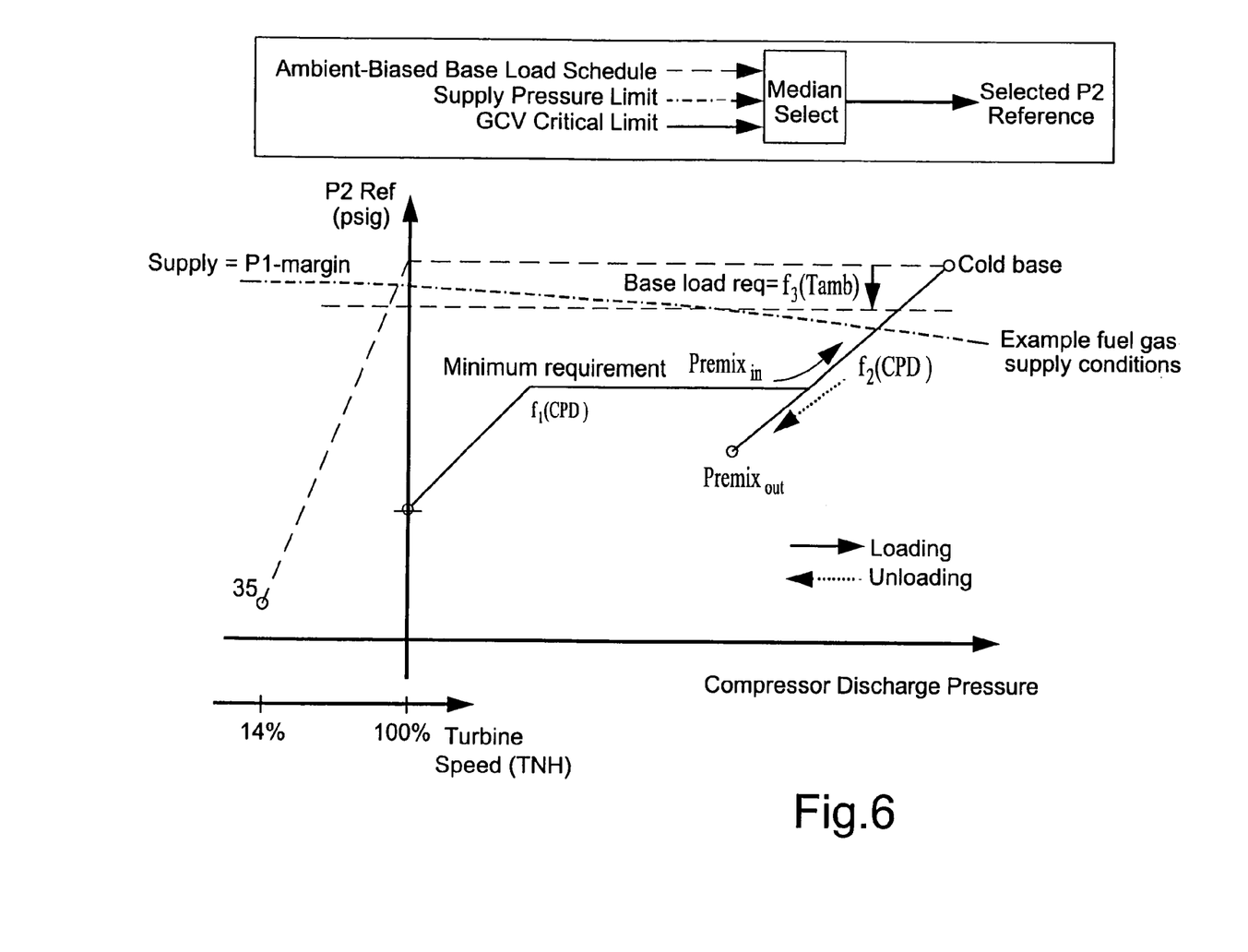
FIG. 6 is a schematic illustration of the P2 pressure reference selection according to an example embodiment of the invention.

Referring to FIG. 6 in an example embodiment, the P2 reference is the median value of three control curves: the minimum allowable pressure requirement (choked pressure requirement), available supply pressure, and base load requirement. The minimum pressure requirement curve is the minimum gas fuel interstage (P2) pressure required in order to maintain choked gas control valves 30, 32, 34, 36, detailed herein below with reference to FIG. 5. The supply pressure curve is the measured P1 pressure upstream of the stop/speed ratio valve 38 (SRV) minus a fixed pressure drop across the SRV. The base load pressure requirement is a minimum of the existing pressure schedule shown in FIG. 3 and an ambient bias of that same schedule. The latter is essentially the gas fuel pressure required for base load operation and will increase or decrease based on compressor inlet temperature (CTIM).

Since the P2 pressure reference will most likely be reduced for any condition other than cold ambient day base load, a P2 correction factor has been applied to the Gas Control Valve scaling gain for open loop control valve position control. The scaling gain bias helps to correct the total fuel demand for the new sliding or modulated P2 reference. This prevents the total fuel flow from decreasing, causing a reduction in gas turbine power output. The correction factor is a ratio of the original P2 reference and the modulated P2 reference:

$$\frac{P_{2ref,original} + P_{ambient}}{P_{2ref,modulated} + P_{ambient}}$$

The start permissive has been modified to allow a gas turbine start when supply pressure is at or above the pressure required for operation at Spinning Reserve. Additionally, in an example embodiment, if the operator presses the master control start button when supply pressure is less than that needed for Premix mode, a pop-up box will appear on the HMI screen stating, e.g., "Gas fuel pressure too low for Premix operation. Continue to start?" This feature allows the operator to decide whether to start the unit with the knowledge that a reduced supply pressure condition exists.

The protective actions have been modified to include a load raise inhibit at a threshold above minimum required P2, which will allow the unit to load up only to the available pressure-limiting point. If the gas turbine were allowed to increase load at this point, the supply pressure minimum requirement would be increased, according to FIG. 6. The unit will automatically decrease power output when any gas control valve 30, 32, 34, 36 or the SRV 38 reaches maximum allowable position. This automatic load reduction is to protect the gas turbine from operating with unchoked valves which, due to error introduced in the open-loop gas control valve distribution control, could possibly cause combustor instability or equipment damage due to high dynamics. If the supply pressure exceeds the maximum decay rate, the turbine will be automatically sent to spinning reserve; at this point the gas turbine is unable to unload at a rate fast enough to exceed the pressure decay. In lieu of a turbine trip, automatic transfer to a secondary fuel can be added as an option. The transfer takes place when the supply pressure is less than the horizontal portion of f1 (Refer to FIG. 6).

Calculations:

Fuel Pressure=f (CPD, Fuel Flow, Fuel Temperature, Nozzle $A_e$) where CPD=Compressor Discharge Pressure and Nozzle $A_e$=Nozzle Effective Area (a "corrected" physical area, which is dependent on pressures, velocities, and temperatures upstream and downstream. This corrected area uses a multiplication factor called "coefficient of discharge" (Cd)).

Fuel pressure upstream to the fuel nozzle (P4) is given by:

$$P_4 = P_{cc} \left[ \frac{1 + \sqrt{1 + 4\left(\frac{M}{A_e P_{cc}}\right)^2 \frac{RT(k-1)}{2gk}}}{2} \right]^{\left(\frac{k}{k-1}\right)}$$

for unchoked nozzle pressure ratios, and $$P_4 = \frac{M}{A_e \sqrt{\frac{gk}{RT} \left(\frac{2}{k+1}\right)^{\frac{(k+1)}{(k-1)}}}}$$

for choked nozzle pressure ratios
where M=Fuel flow, lb/sec
$P_{cc}$=CPD-Combustor Pressure Drop
g=Acceleration due to gravity, ft/sec$^2$
k=specific heat ratio, $C_p/C_v$
R=Universal gas constant, lbf.ft/lbm.R
T=Fuel Temperature, degrees Rankine Flow through an orifice, nozzle or valve is a function of upstream and downstream pressure conditions. The ratio of those pressures dictates the quantity of flow. When the ratio is above a fixed number called the 'critical pressure ratio', the valve (or orifice or nozzle) is considered choked. At any point above this pressure ratio, the mass flow through the valve is fixed. Typical gas fuel nozzles are designed to operate below the critical pressure ratio. Critical Pressure Ratio (CPR) for gas fuel nozzles is a function of its k (Cp/Cv ratio) and a typical CPR is 1.78. So for normal operation fuel nozzles always operate unchoked and gas control valves operate choked. However, recent combustion systems have a much larger fuel split variation through each circuit and choked nozzle pressure ratios have been observed for a few cases with a very high fuel split and relatively smaller size nozzle. To calculate P4 on our fuel system, an iterative method was used to calculate flow and Nozzle Pressure Ratio (NPR). In this method, we choose the P4 formula based on the NPR calculated in the earlier iteration.

The minimum allowable requirement fuel gas supply pressures f1 & f2 can be calculated as:

Fuel Supply Pressure (fx)=$P_4$+Piping Pressure Drop+ Gas Control Valve DP

The "Piping Pressure Drop" is due to curves and bends in the piping that carry fuel from the gas control valve to the fuel nozzle. This pressure drop is assumed constant even though it varies slightly with boundary conditions. The constant is based on previous engineering experience.

The "Gas Control Valve Pressure Drop" also an assumed constant pressure drop. This number is a multiplication factor that comes from the valve manufacturer.

An example of the minimum allowable requirement fuel supply pressure requirement fx as calculated above is shown in FIG. 5. The peaks and valleys represent combustion system mode transfers. The curves f1 and f2 make up the minimum allowable pressure peaks but ignoring the valleys. Thus, the plateau requirement, allowing enough pressure to get over the of f1/f2 curve illustrated in FIGS. 3 and 6 is based on the largest intermediate pressure spike as shown in FIG. 5.

Thus, in contrast to the conventional control philosophy and in contrast to the pressure control at Baglan Bay mentioned above, the fuel pressure reference (P2 reference or P2 supply requirement) upstream of the gas control valves, according to an example embodiment of the invention, is now a function of ambient temperature, to take advantage of the lower fuel pressure requirement on warmer days.

A main advantage of the invention is the capability to start the gas turbine and operate the gas turbine with reduced gas fuel supply pressures, which will be based on actual hardware requirements rather than a fixed worst case requirement. The modulated pressure control strategy will reduce gas turbine load as much as is necessary when supply pressure falls below the supply pressure requirement and will allow the gas turbine to reload once supply pressure recovers.

In addition, the reduced supply pressure requirement as a function of compressor discharge pressure will likely allow plant gas compressors to be turned off during the summer months when ambient temperatures are higher. In many cases, the need for gas compressors may be eliminated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine combustor provided with a plurality of fuel nozzles and a pressure control system for controlling fuel supply pressure to said fuel nozzles, comprising:
   fuel pipes defining a path for gas fuel to flow from an upstream fuel inlet to said fuel nozzles, including a main fuel pipe and a distribution fuel pipe to said fuel nozzles;
   a fuel flow rate control valve for controlling fuel flow in said distribution fuel pipe to said fuel nozzles; and
   a pressure control valve disposed in said main fuel pipe, upstream from said fuel flow rate control valve,
   wherein said pressure control system is a non-transitory tangible memory device operatively coupled to said pressure control valve and to said fuel flow rate control valve to control a pressure downstream of said pressure control valve and flow through said fuel flow rate control valve, said control system selectively setting a fuel pressure reference for control of the pressure control valve based on a compressor discharge pressure, CPD.

2. A gas turbine combustor as in claim 1, wherein said pressure control system selectively sets the fuel pressure reference for control of the pressure control valve based on a minimum required fuel pressure to maintain choked operation of said fuel flow rate control valve.

3. A gas turbine combustor as in claim 2, wherein said control system selectively sets the fuel pressure reference based on said minimum required fuel pressure requirement, an available supply pressure, and a base load fuel pressure requirement.

4. A gas turbine combustor as in claim 3, wherein said base load fuel pressure requirement is based on a cold ambient day base load pressure requirement.

5. A gas turbine combustor as in claim 3, wherein said base load pressure requirement is based on a cold ambient day base load fuel pressure requirement that has been adjusted based on compressor inlet temperature.

6. A gas turbine combustor as in claim 2, wherein the minimum required fuel pressure requirement is determined based on a first required fuel pressure, $P_4$, directly upstream to the fuel nozzle, a piping pressure drop between said fuel flow rate control valve and the fuel nozzle, and said fuel flow rate control valve pressure drop.

7. A gas turbine combustor as in claim 6, wherein the control system selectively determines said first required fuel pressure based on said compressor discharge pressure, CPD.

8. A gas turbine combustor as in claim 7, wherein the control system calculates said first required fuel pressure, $P_4$, as $$P_4 = P_{cc}\left[\frac{1+\sqrt{1+4\left(\frac{M}{A_e P_{cc}}\right)^2 \frac{RT(k-1)}{2gk}}}{2}\right]^{\left(\frac{k}{k-1}\right)}$$

for unchoked nozzle pressure ratios and as $$P_4 = \frac{M}{A_e\sqrt{\frac{gk}{RT}\left(\frac{2}{k+1}\right)^{\frac{(k+1)}{(k-1)}}}}$$

for choked nozzle pressure ratios, where:
M=Fuel flow, lb/sec
$P_{cc}$=CPD—Combustor Pressure Drop
$A_e$=Nozzle Effective Area
g=Acceleration due to gravity, ft/sec2
k=specific heat ratio, $C_p/C_v$
R=Universal gas constant, lbf-ft/lbm-R
T=Fuel Temperature, degrees Rankine.

* * * * *

UNITED STATES PATENT AND TRADEMARK OFFICE
CERTIFICATE OF CORRECTION

PATENT NO.         : 8,286,414 B2                                        Page 1 of 1
APPLICATION NO.    : 12/457075
DATED              : October 16, 2012
INVENTOR(S)        : Gallagher et al.

It is certified that error appears in the above-identified patent and that said Letters Patent is hereby corrected as shown below:

At column 6, lines 18-19, "allowable pressure peaks but ignoring the valleys. Thus, the plateau requirement, allowing enough pressure to get over the" should be -- allowable pressure requirement, allowing enough pressure to get over the peaks but ignoring the valleys. Thus, the plateau --

Signed and Sealed this
Twenty-fifth Day of December, 2012

David J. Kappos
*Director of the United States Patent and Trademark Office*